US005580664A

United States Patent [19]

Tsai

[11] Patent Number: 5,580,664

[45] Date of Patent: Dec. 3, 1996

[54] DUAL STATUS THIN-FILM EAS MARKER HAVING MULTIPLE MAGNETIC LAYERS

[75] Inventor: Ching-Long Tsai, Woodbury, Minn.

[73] Assignee: Minnesota Mining and Manufacturing Company, St. Paul, Minn.

[21] Appl. No.: 368,748

[22] Filed: Jan. 4, 1995

Related U.S. Application Data

[63] Continuation-in-part of Ser. No. 263,259, Jun. 21, 1994, abandoned, which is a continuation-in-part of Ser. No. 996,182, Dec. 23, 1992, abandoned.

[51] Int. Cl.[6] .......................... B32B 9/00

[52] U.S. Cl. .......................... 428/457; 428/900; 428/611; 428/621; 340/551; 340/572

[58] Field of Search .......................... 428/607, 611, 428/622, 626, 650, 651, 679, 212, 457, 900; 340/551, 572

[56] References Cited

U.S. PATENT DOCUMENTS

| | | | |
|---|---|---|---|
| Re. 32,427 | 5/1987 | Gregor et al. | 340/572 |
| 3,765,007 | 10/1973 | Elder | 340/280 |
| 4,539,558 | 9/1985 | Fearon | 340/572 |
| 4,682,154 | 7/1987 | Fearon et al. | 340/572 |
| 4,710,754 | 12/1987 | Montean | 340/572 |
| 4,746,908 | 5/1988 | Montean | 340/551 |
| 4,960,651 | 10/1990 | Pettigrew et al. | 428/607 |
| 5,010,320 | 4/1991 | Cordery | 428/900 |
| 5,015,993 | 5/1991 | Strom Olsen | 340/572 |
| 5,083,112 | 1/1992 | Piotrowski et al. | 340/572 |
| 5,405,702 | 4/1995 | Piotrowski | 428/900 |

FOREIGN PATENT DOCUMENTS

| | | | |
|---|---|---|---|
| 0295028 | 12/1988 | European Pat. Off. | H01F 10/00 |
| 0459722 | 5/1991 | European Pat. Off. | G08B 13/24 |
| 0448114 | 9/1991 | European Pat. Off. | H01F 10/00 |
| WO90/07784 | 7/1990 | WIPO | H01F 41/26 |

*Primary Examiner*—Patrick Ryan
*Assistant Examiner*—Patrick Jewik
*Attorney, Agent, or Firm*—Gary L. Griswold; Walter N. Kirn; Kari H. Bartingale

[57] ABSTRACT

A dual status marker for use with a magnetic-type EAS system has a signal-producing layer including at least one magnetic thin-film of high permeability and low coercive force such as permalloy, and a signal-blocking layer including at least one remanently magnetizable thin-film such as an Fe-Cr alloy. The remanently magnetizable thin-film or thin-films should have a total thickness at least equal to, and preferably at least twice, the total thickness of the magnetic thin-film or thin-films of high permeability. By doing so, the marker is more reliably deactivated when the signal-blocking layer is magnetized. For even greater assurance of deactivation, the signal-blocking layer should include more than one remanently magnetizable thin-film, thus giving it a squarer B-H loop and greater assurance against false alarms.

16 Claims, 4 Drawing Sheets

DUAL STATUS THIN-FILM EAS MARKER HAVING MULTIPLE MAGNETIC LAYERS

This is a continuation-in-part of application No. 08/263,259, now abandoned, filed Jun. 21, 1994 which was a continuation-in-part of U.S. Ser. No. 07/996,182 filed Dec. 23, 1992, now abandoned.

BACKGROUND OF THE INVENTION

1. Field of the Invention

The invention relates to reversibly reactivatable dual status markers useful in magnetic-type electronic article surveillance (EAS) systems. When an article bearing one of those markers is passed through an interrogation zone of alternating magnetic fields, the magnetization state of the marker is periodically reversed, and a remotely detectable characteristic response (here sometimes called "an alarm signal") is produced. The invention also relates to the manufacture of such markers and to a product that can be used as a control element to afford dual status to a marker of the prior art.

2. Description of the Related Art

Magnetic-type EAS systems are widely used to inhibit the theft of merchandise such as clothing, books, and cassettes. Markers used in such systems typically have comprised elongated ribbons of metal foil that exhibit high permeability and low coercive force to enable their state of magnetization to reverse in the relatively low intensity alternating magnetic fields typically associated with magnetic-type EAS systems. Those fields have average peak intensities of a few Oersteds, typically ranging from about one Oersted at the center to about 20 Oersteds at the edges of the interrogation zone of an EAS system.

In coassigned U.S. Pat. No. 3,765,007 (Elder), a remanently magnetizable layer is laminated to such a ribbon and acts as a control element to afford dual status to the marker. It has a passive status when the remanently magnetizable layer is magnetized to prevent the marker from producing an alarm signal when an article to which it is attached is carried through an interrogation zone of an EAS system. It has a sensitized status when the remanently magnetizable layer is demagnetized, thus enabling the marker to produce an alarm signal. The Elder patent also suggests that a disc-shaped marker, which is sufficiently thin, can have a useful demagnetization factor.

Coassigned U.S. Pat. Nos. 4,710,754 and 4,746,908 (both Montean) disclose markers of low coercive force, high permeability material such as permalloy foil that can be the size of postage stamps. The foil of Montean '754 is shaped to have at least one switching section and flux collectors proximate to each end of each switching section. When it has at least two switching sections that extend in substantially different directions, the marker can be detected regardless of its orientation. Such a marker can be called "bi-directional" in contrast to the unidirectional markers of the Elder patent. When a sensitized unidirectional marker is passed through an interrogation zone with its easy axis perpendicular to all components of the alternating magnetic fields, the magnetization of its signal-producing foil might not be reversed and thus fail to produce an alarm signal.

The marker of Montean '908 also can be bi-directional. It has a specially shaped foil which bears a remanently magnetizable layer that, when magnetized in a predetermined pattern, permits the marker to produce an alarm signal in an interrogation zone. When the remanently magnetizable layer is demagnetized, the marker will not produce an alarm signal.

Markers of Montean '754 and '908 are currently being marketed as QuadraTag™ EAS markers by the company to which this application is assigned.

U.S. Pat. No. 4,960,651 (Pettigrew et al.) points out that a marker, when sensitized, should have low demagnetization factors to permit low intensity interrogation fields to be used, and that metal ribbons such as ribbons of permalloy foil must be quite long to achieve low demagnetization factors. The Pettigrew patent concerns a marker that has low demagnetization factors and is made by depositing onto a substrate a magnetic thin-film of low coercive force and high permeability that preferably is from 1 to 5 μm in thickness. As compared to markers of metal ribbons which are relatively thick (generally over 10 μm and often about 25 μm in thickness), the Pettigrew thin-film marker can be quite thin and more mechanically flexible and hence more robust. By being thin, it can be less conspicuous. Also, it can have a more convenient shape such as the dimension and shape of a price label and can be square or circular.

The Pettigrew marker can be made to have dual status by applying a deactivation layer of semi-hard magnetic material to change the effective magnetic properties of the magnetic thin-film of low coercive force so that it is not recognized in an interrogation zone. In each of the examples of the Pettigrew patent, the deactivation layer employed a thin sheet (col. 15, line 9) or a foil, slurry, needles, or steel wool or mesh (col. 16, lines 15–24). The Pettigrew patent does suggest: "The deactivating material may be fabricated by thin film processes" (col. 6, lines 62–64) but includes no enabling disclosure, instead referring to disclosure for fabricating the magnetic thin-films of low coercivity.

Still others have sought to provide markers utilizing thin-films. Thus, for example, Fearon, U.S. Pat. No. 4,539,558 (col. 16, lines 2–14), has proposed that an elongated marker may be formed of a strip of alternating sputtered layers of ferromagnetic materials. In that construction, each layer is separated by an evaporated coating of, for example, aluminum oxide. Fearon still emphasizes the necessity of an elongated shape and the subsequent need for appropriate orientation in an interrogation field. See also U.S. Pat. No. 4,682,154 (Fearon).

The marker of coassigned U.S. Pat. No. 5,083,112 (Piotrowski et al.) comprises a laminate of a plurality of magnetic thin-films deposited on a flexible substrate with an ultrathin nonmagnetic thin-film interposed between adjacent magnetic thin-films. Each of the magnetic thin-films exhibits high permeability and a coercive force sufficiently low so as not to retain any given magnetization state and less than the average intensity of magnetic fields encountered in an interrogation zone, such that upon exposure to such fields, the magnetization state of the marker is periodically reversed and an alarm signal is produced. When the easy axis of one of the magnetic thin-films extends in a direction different from that of another (as in FIG. 3) or a magnetic thin-film has more than one easy axis, the marker is bi-directional.

The Piotrowski patent demonstrates that a plurality of magnetic thin-films permit the markers to be smaller and yet produce sharper, more intense signals than was possible in the prior art. Its five examples employ from 7 to 15 pairs of magnetic thin-films (e.g., Ni-Fe) and nonmagnetic thin-films (e.g., $SiO_x$). To provide dual status, the Piotrowski marker can include a layer of remanently magnetizable material such as a thin foil of magnetic stainless steel or vicalloy or a dispersion of gamma iron oxide particles.

SUMMARY OF THE INVENTION

A reversibly reactivatable dual status marker for use with a magnetic-type EAS system produces, in an interrogation zone, alternating magnetic fields having average peak intensities of a few Oersteds.

The dual status marker of the invention has a substrate and, supported by the substrate, a signal-producing layer and a signal-blocking layer. The signal-producing layer is of a material having a high permeability and a coercive force less than the minimum peak intensity encountered in the interrogation zone, such that upon exposure to the alternating magnetic fields, the magnetization state of the signal producing layer is periodically reversed and a remotely detectable characteristic response (i.e., an alarm signal) is produced.

The signal-blocking layer includes at least one remanently magnetizable thin-film having a coercivity greater than the peak field intensity in the interrogation zone and providing magnetic flux sufficient to prevent the signal-producing layer from producing an alarm signal in the interrogation zone when the signal-blocking layer is magnetized.

BRIEF DESCRIPTION OF THE DRAWINGS

In the drawings, where like numerals refer to like elements throughout the views.

DETAILED DESCRIPTION OF THE PREFERRED EMBODIMENTS

Figure 1:
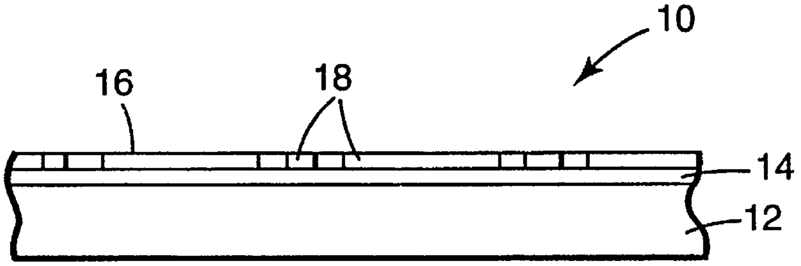
FIG. 1 is an edge view of a dual status EAS marker of the invention.

The invention provides a reversibly reactivatable dual status marker for use with a magnetic-type EAS system that produces, in an interrogation zone, alternating magnetic fields having average peak intensities of a few Oersteds. The dual status marker of the invention should be as economical to manufacture as any prior marker, and should be at least as small in area and thinner, more flexible, and more durable than any above-discussed marker without any reduction in performance. The novel marker should function well at thicknesses that are so thin that it can be virtually undetectable when hidden between layers of some garments. As was pointed out in the Montean U.S. Pat. No. 4,746,908, "potential thieves have been known to carry a small permanent magnet in attempts to magnetize, i.e., desensitize the markers to thereby thwart detection" (col. 1, lines 51–54), but this would be difficult if the markers could not be found.

Briefly, the dual status marker of the invention has a substrate and, supported by the substrate, a signal-producing layer and a signal-blocking layer. Preferably, both the signal-producing and signal-blocking layers are manufactured by thin-film processes. For purposes of the present specification, the term "thin-film processes" refers to the formation of films onto a supporting substrate by deposition in vacuum by electron beam evaporation, sputtering, electrodeposition, etc. Thin-film growth on the substrate involves the formation of independently nucleated particles which grow together to form a continuous film as the deposition continues. The physical, magnetic and other properties of the resulting thin-film, or deposition film as they will be interchangeably referred to herein, are affected by the nature of the substrate, the rate of film deposition and the thickness, structure and composition of the film. As is well-known to those of skill in the art, the physical properties of these deposition films are quite different from "foils" or other materials which are prepared by rolling, casting or extruding a bulk sample down to the desired thickness. Thin-films are also to be distinguished from slurries, dispersions or other coatings not manufactured by the above-described thin-film processes. For purposes of the present specification, it shall be understood that the terms "thin-films" or "deposition films" will be used interchangeably herein to refer to films manufactured by the above defined "thin-film processes". More details on thin films and thin-film processes can be found in the "Handbook of Thin-Film Technology", edited by Maissel and Glang, and published by McGraw Hill, New York, N.Y., 1970. The signal-producing layer includes at least one magnetic thin-film having high permeability and a coercive force less than the minimum peak intensity encountered in said zone, such that upon exposure to fields of an interrogation zone, the magnetization state of said at least one magnetic thin-film is periodically reversed and a remotely detectable characteristic response (i.e., an alarm signal) is produced. Said at least one magnetic thin-film should have a total thickness of from 200 to 1000 nm. At total thicknesses substantially below 200 nm, a marker might fail to produce an alarm signal in some magnetic-type EAS systems, while total thicknesses substantially above 1000 nm would increase the cost of the marker without significant benefit.

The signal-blocking layer of the novel marker includes at least one remanently magnetizable thin-film having a total thickness at least equal to the total thickness of said at least one magnetic thin-film of the signal-producing layer. The signal-blocking layer should be in substantial contact with and extend over an area of the signal-producing layer and should have a size and coercivity sufficient to prevent the signal-producing layer from producing an alarm signal in the interrogation zone when the signal-blocking layer is magnetized.

Because the signal-producing layer and the signal-blocking layer can be created sequentially on the same equipment at one time, the novel marker can be produced at reasonable cost.

Preferably the coercivity of the signal-blocking layer does not exceed 100 oersteds so that it can be demagnetized by a magnetic field that is weak enough not to damage any article to which a marker may be attached, e.g., not to erase any data on the magnetic tape of a cassette. Preferably the coercivity of the signal-blocking layer is at least 25 Oersteds to guard against accidental demagnetization or remagnetization.

The signal-blocking layer of the novel marker should have adequate thickness to provide enough magnetic flux, when magnetized, to saturate adjacent portions of the signal-producing layer. To ensure this, the total thickness of said at least one remanently magnetizable thin-film preferably is from two to five times the total thickness of said at least one magnetic thin-film of the signal-producing layer. For economy of manufacture, said at least one magnetic thin-film preferably has a total thickness of from 200 to 500 nm, and said at least one remanently magnetizable thin-film is from 800 to 1200 nm in total thickness. At total thicknesses substantially greater than 1200 nm, electrically conductive, remanently magnetizable thin-films could propagate eddy currents when subjected to interrogating fields of high frequency, and so might have an undesirable shielding effect when demagnetized. Interrogating fields of higher frequency enable a signal-producing layer of the novel marker to produce alarm signals of greater amplitude.

Although a single remanently magnetizable thin-film should be sufficient, a plurality of remanently magnetizable thin-films and interposed nonmagnetic thin-films enables the signal-blocking layer to have a squarer B-H loop and hence greater remanent flux density at the surfaces of the signal-blocking layer. Such a signal-blocking layer, when magnetized, more reliably disables the signal-producing layer. To afford equal assurance against false alarms, a single remanently magnetizable thin-film might need to be so thick, and hence so difficult and expensive to manufacture, as to make the marker uneconomical. Preferably, the signal-blocking layer has from 3 to 11 pairs of remanently magnetizable thin-films and interposed nonmagnetic thin-films.

Figure 5:
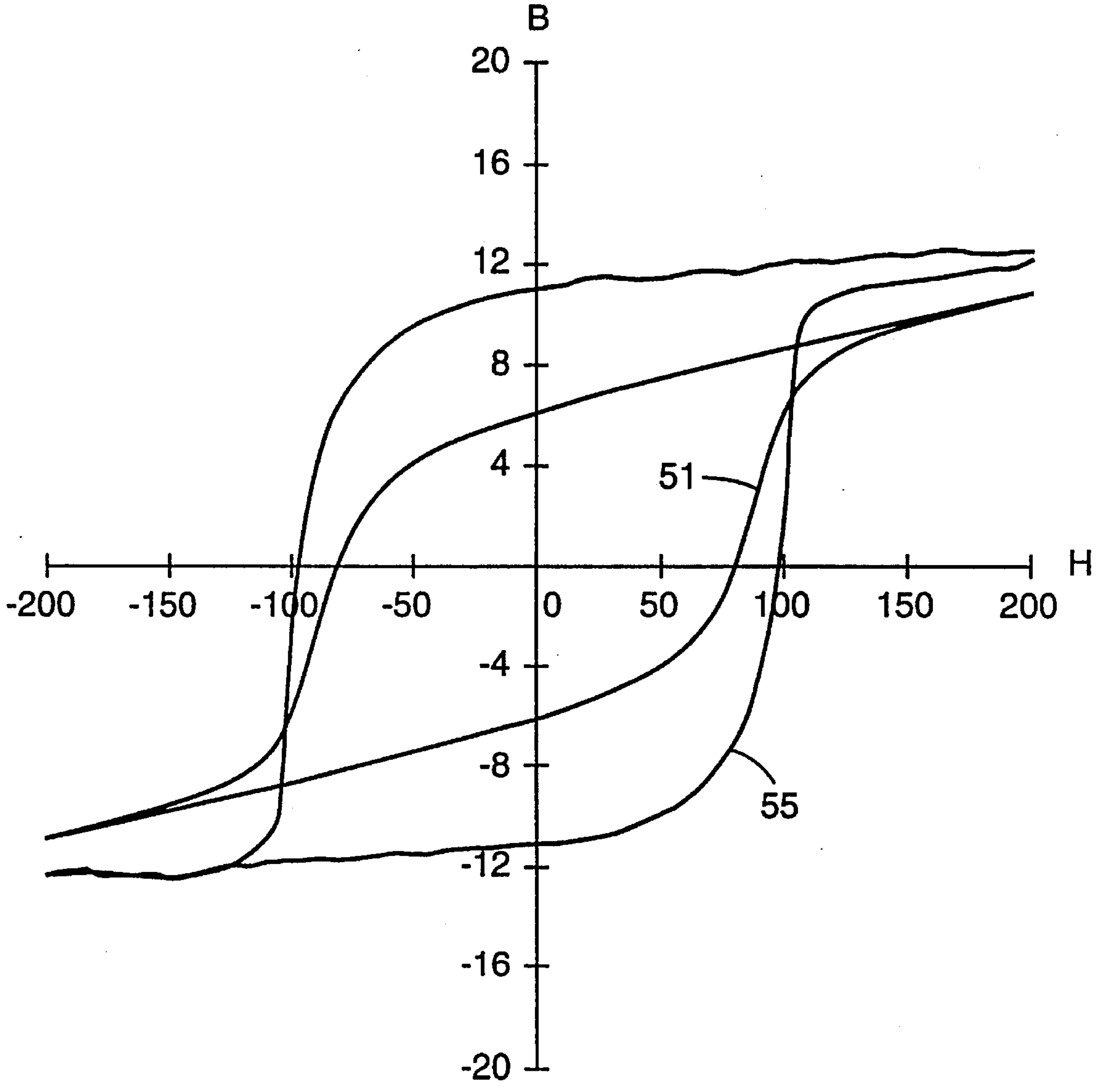
FIG. 5 is a graph of B-H loops for various films having different numbers of layers.

Although the signal blocking layer can be constructed using a single layer of remanently magnetizable thin-film, a multilayered signal blocking layer can also be constructed. FIG. 5 illustrates the effect of using a plurality of remanently magnetizable FeCr thin-films in the signal-blocking layer. Curve 51 shows a single FeCr thin-film as the signal-blocking layer, and curve 52 shows a multiple layer stack of five FeCr thin-films interspersed with nonmagnetic thin-films as the signal-blocking layer. Even though both films in FIG. 5 have about the same amount of magnetic material (the thickness of the single layer is about 350 nm, and the combined thickness of the magnetic layers in the multilayer sample is also about 350 nm), their magnetic properties are very different. The single-layered sample shown by curve 51 has a "skewed" B-H loop. This is due to strong perpendicular anisotropy in the single-layered film characterized by a perpendicular easy axis of magnetization. The perpendicular anisotropy is in turn due to the columnar structure formed as the film is grown. By layering several thin-films to produce the multilayered signal-blocking layer shown by curve 55, the columnar structure is minimized and the perpendicular anisotropy is reduced. Because the multilayered sample has less perpendicular anisotropy, the multilayered signal-blocking layer has a squarer loop, as shown in FIG. 5 for the 5-layered film. The higher squareness (Br/Bm) for the multilayered sample means that it has a larger remanence, and therefore produces more magnetic flux to saturate the signal-producing layer, and is thus a more effective signal blocking layer. For comparison, the squareness for the 5-layered sample is 0.88, while the squareness for the single-layered sample is only 0.55. The multilayered sample is thus significant because better performance can be achieved using the same amount of magnetic material.

Figure 6:
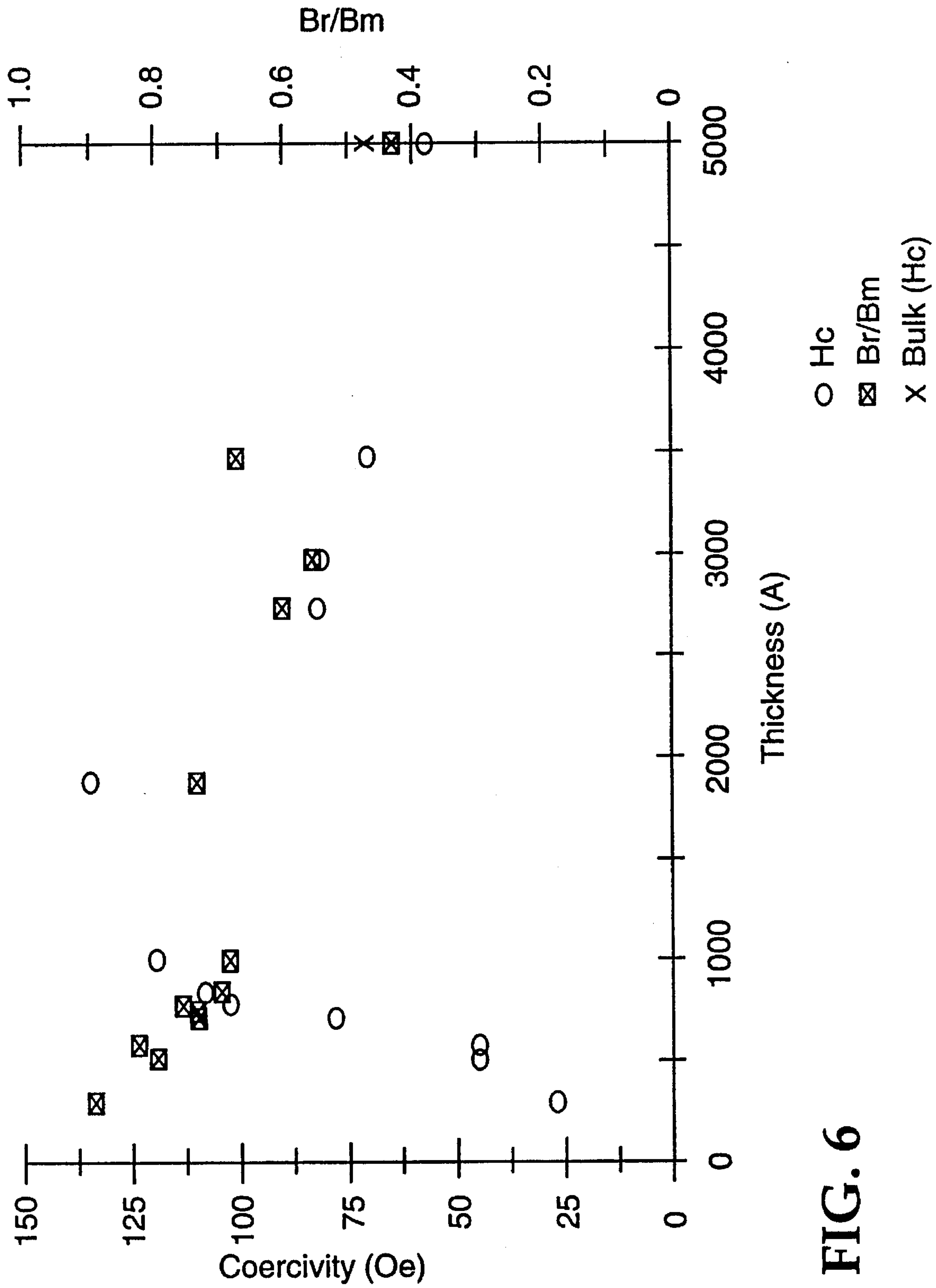
FIG. 6 illustrates the dependence of coercivity and squareness on thickness of the films.

FIG. 6 illustrates how the coercivity and squareness of FeCr thin films depend on the thickness of the film. The coercivity increases with thickness when the film is below 1000 A (or 100 nm), decreases with thickness when the film is thicker than 300 nm. The squareness of the film decreases with the thickness of the film. The film above 5000 A (or 500 nm) approaches the properties of bulk materials. A preferred FeCr film thickness is therefore chosen at approximately 2000 A (or 200 nm), which has acceptable coercivity and squareness.

When its signal-producing layer comprises a single magnetic thin-film, the novel marker can produce a signal that is sufficiently sharp and intense to produce alarm signals in most magnetic-type EAS systems now on the market. However, when (as in the Piotrowski patent) the signal-producing layer comprises a plurality of magnetic thin-films and interposed nonmagnetic thin-films, the novel marker can produce a sharper, more intense and hence more reliable signal. Preferred magnetic thin-film materials for the signal-producing layer include permalloy, "Sendust," and amorphous magnetic alloys such as are listed in Re. 32,427 (Gregor et al.) at col. 6, lines 11–18.

Ideally, the signal-blocking layer is in intimate contact with the signal-producing layer so that when the signal blocking layer is magnetized, its magnetic flux is efficiently shunted through the signal-producing layer. However, to guard against any chemical reaction or undesirable magnetic exchange coupling between the materials of the signal-blocking and signal-producing layers, it may be desirable to interpose an ultrathin nonmagnetic thin-film layer. Any such ultrathin nonmagnetic thin-film that is either interposed between the signal-producing and signal-blocking layers, or is interposed between a plurality of magnetic thin-films of the signal-producing layer, should be thinner than the thin-films it is separating and should be as thin as possible, such as from 5 to 20 nm.

Remanently magnetizable materials that have been most effective for the signal-blocking layer are Fe-Cr alloys having a Cr content up to about 20 atomic percent. Preferably, the Cr content is from 1 to 15 atomic percent to afford a coercivity of from 25 to 100 Oersteds. Other useful remanently magnetizable materials include Fe-Co-Cr, Fe-Ni-Cr, and Ni-Co alloys and partially oxidized Ni-Fe alloys.

Ultrathin nonmagnetic thin-films may be readily formed from an oxide of silicon, aluminum, or the like.

Each of the nonmagnetic thin-films, magnetic thin-films of the signal-producing layer, and remanently magnetizable thin-films of the signal-blocking layer can be formed by evaporation, sputtering, sublimation, etc.

The signal-blocking layer of the thin-film of the novel dual status marker preferably is discontinuous or, if continuous, is magnetized in an alternating pole pattern by a device such as that of FIG. 23 of Montean U.S. Pat. No. 4,746,908, thus better ensuring deactivation of said at least one magnetic thin-film. A discontinuous signal-blocking layer allows the novel marker to be magnetized in any magnetic-type EAS system now on the market, whereas a continuous signal-blocking layer might not become sufficiently demagnetized in apparatus of an EAS system that deactivates a marker by translating it across a unidirectional magnetic field. A continuous signal-blocking layer can be made discontinuous by scoring, or a discontinuous thin-film or thin-films can be applied through masks. Suitable discontinuous patterns are those of the magnetizable material 86 of FIG. 5 of the Piotrowski patent and the magnetizing elements 44 of FIG. 4 of the Gregor patent. Preferably, the segments of a discontinuous pattern are of substantially uniform size and shape and each has a area of from 1 to 100 $mm^2$.

The substrate of the novel marker preferably is flexible, e.g., a polyimide or high-temperature-resistant polyester web from 25 to 50 μm thick. While polyimide has superb mechanical properties, including stability at elevated temperatures, it is highly hygroscopic, retaining about 1 percent by weight of water. It is necessary to outgas such films prior to deposition. Such outgassing has been obtained by passing the substrate films within a vacuum chamber three times at a rate of approximately 60 cm per minute over a roller heated to 315° C. For some applications, thin metallic foils of nonmagnetic stainless steel, aluminum, and copper can also be used.

The substrate can either become a permanent part of the novel marker, or the thin-films can be transferred from substrates to articles which are to be protected against theft, e.g., to the shell of a cassette. Upon doing so, it may be desirable to apply an opaque coating to make the marker invisible.

As in the Pettigrew patent, the novel marker can have a variety of shapes, such as the size and shape of a price label, and it can be square or circular. In order to produce a readily detectable alarm signal, its area preferably is at least 1 $cm^2$, more preferably from 2 to 10 $cm^2$. For the same reason, said at least one magnetic thin-film preferably has a maximum differential permeability of at least 5,000 and a coercive force no greater that 5 Oersteds.

Figure 2:
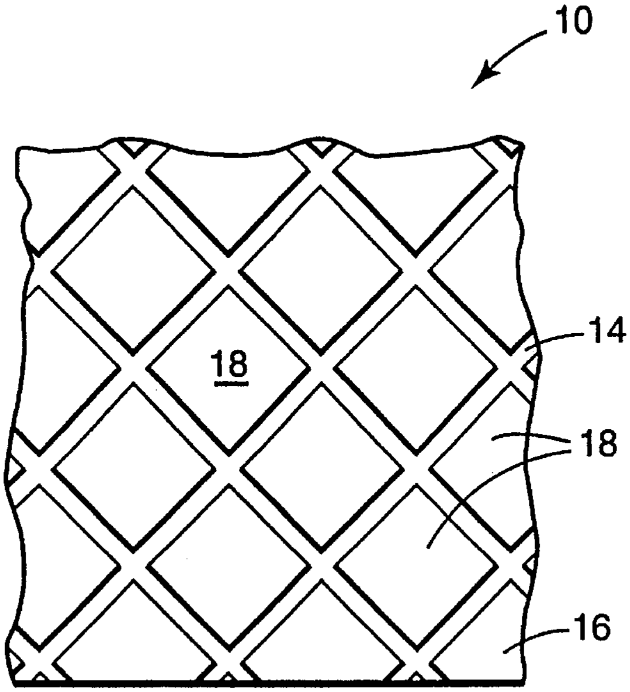
FIG. 2 is a plan view of the marker of FIG. 1.

Referring to FIG. 1, a dual status EAS marker 10 has a flexible substrate 12 bearing a magnetic thin-film 14 that has high permeability and low coercive force, e.g., permalloy, and serves as a signal-producing layer. In contact and coterminous with the magnetic thin-film 14 is a remanently magnetizable thin-film 16 that serves as a signal-blocking layer. As seen in FIG. 2, the remanently magnetizable thin-film 16 has a discontinuous pattern of squares 18.

Figure 3:
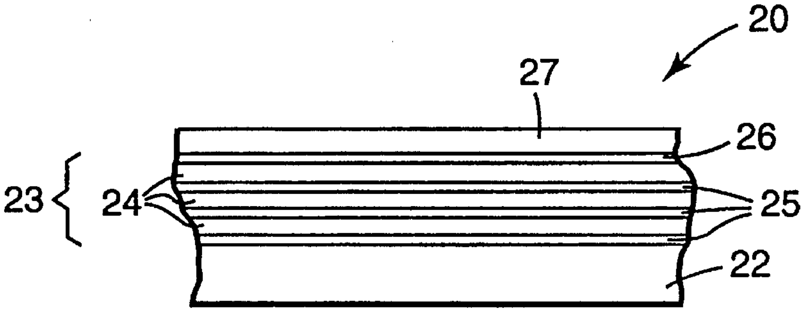
FIG. 3 is an edge view of a second dual status EAS marker of the invention.

FIG. 3 shows a second dual status EAS marker 20 that has a flexible substrate 22 on which is deposited a signal-producing layer 23 including a plurality of magnetic thin-films 24, such as permalloy, and ultrathin nonmagnetic thin-films 25, such as $SiO_x$, with an ultrathin nonmagnetic thin-film 25 interposed between adjacent magnetic thin-films 24. In contact and coterminous with the outermost magnetic thin-film 24 is a nonmagnetic thin-film 26 which is covered by a continuous remanently magnetizable thin-film 27 that serves as a signal-blocking layer.

Figure 4:
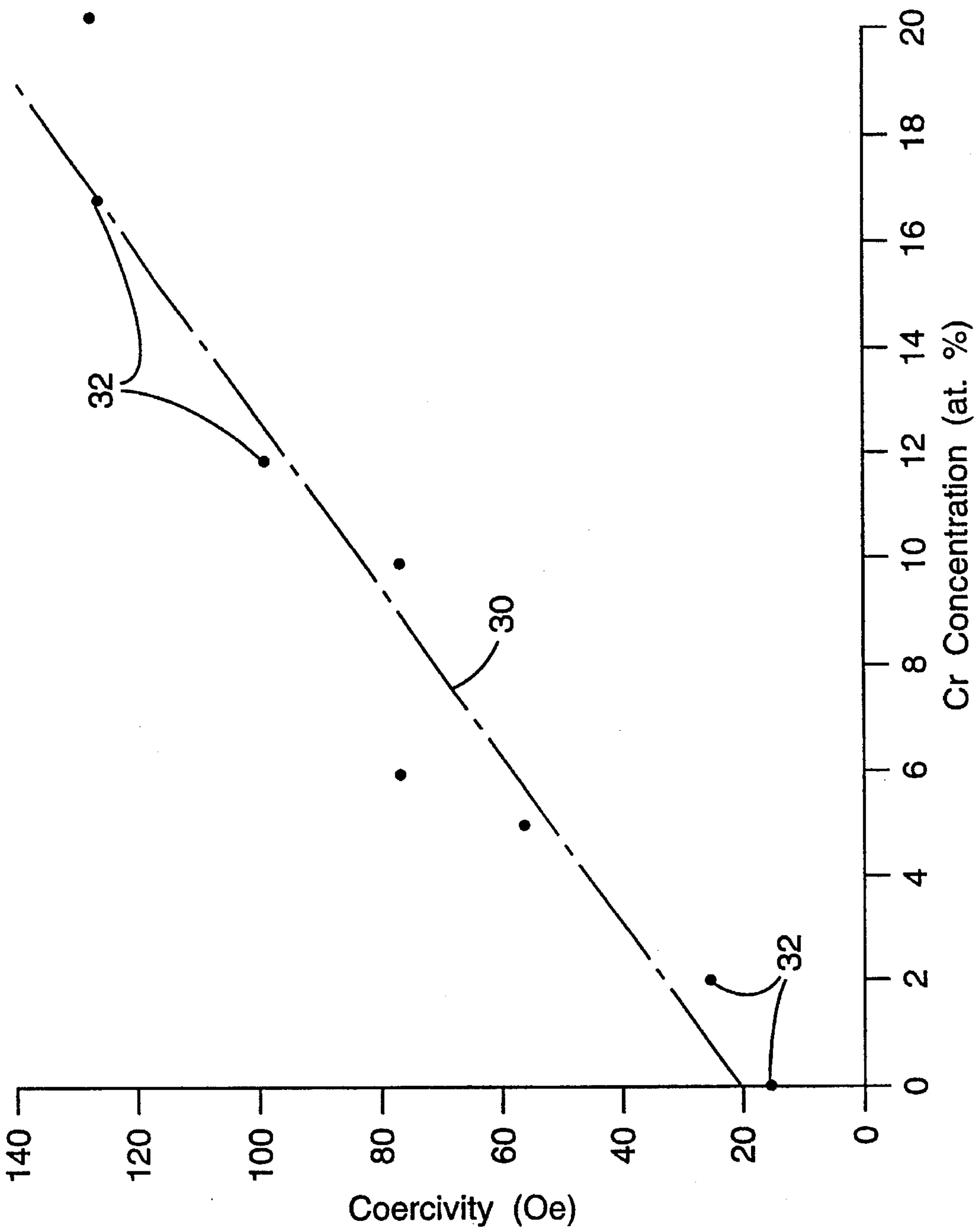
FIG. 4 is a graph showing coercivities of various Fe-Cr alloys that can be used as the signal-blocking layer of an EAS marker of the invention.

In FIG. 4, a line 30 indicates approximate coercivities of Fe-Cr alloys based on test values 32 on thin-films.

EXAMPLE 1

A dual status marker as shown in FIG. 3 was prepared using an ion beam sputtering/deposition unit and a glass substrate. Onto the glass substrate was deposited a coterminous thin-film of amorphous Co-based alloy to a thickness of 350 nm. This was then annealed at 350° C. for 30 minutes in a unidirectional magnetic field having an intensity of 5 Oe along the plane of the thin-film. In an alternating magnetic field of 10 kHz and an amplitude of 2 Oe, a sample 2.5 cm square had

| | |
|---|---|
| $B_m$ | 7647 G |
| $B_r/B_m$ | 0.74 |
| $H_c$ | 0.21 Oe |
| $\frac{dB}{dH}\Big\vert_{H_c}$ | 32581 |

Onto this signal-producing layer was deposited an ultrathin Si thin-film over which a signal-blocking layer was applied by depositing five thin-films of an $Fe_{90}$-$Cr_{10}$ alloy interposed with four nonmagnetic Si thin-films, all of which were coterminous with the substrate. The remanently magnetizable Fe-Cr thin films afforded dual status to the resulting marker. Each of the Fe-Cr thin-films was 70 nm in thickness, and each of the ultrathin Si thin-films was 10 nm in thickness. The Fe-Cr thin-films together provided a continuous signal-blocking layer having a coercivity of about 100 Oersteds with a squareness of about 0.9.

The signal-blocking layer was then magnetized to have 12 rows per inch (4.7 rows/cm) of oppositely-directed magnetized regions, thus preventing the marker from producing an alarm signal when exposed to the aforementioned magnetic field. In that field, the hysteresis curve of the signal-producing layer became a minor loop, resulting in a signal too low in harmonic content to be recognized as an alarm.

The dual status marker was tested in 3M's Model 3300B magnetic-type EAS system. When its signal-blocking layer was magnetized, the marker was passive and did not produce an alarm signal in the interrogation zone of the EAS system. When the signal-blocking layer was demagnetized, the magnetization state of the signal-producing layer was periodically reversed to produce an alarm signal.

EXAMPLE 2

Onto a high-temperature-resistant poly(ethyleneterephthalate) film, 50 μm in thickness, were deposited seven layer pairs of seven magnetic thin-films of Ni-Fe alloy (each 50 nm in thickness applied by electron-beam evaporation), and seven nonmagnetic thin-films of $SiO_x$ (each 10 nm in thickness applied by sublimation) to create a signal-producing layer having Ni-Fe at the surface. In an alternating magnetic field of 10 kHz and an amplitude of 2 Oe, a sample 2.5 cm square had

| | |
|---|---|
| $B_m$ | 9899 G |
| $B_r/B_m$ | 0.76 |
| $H_c$ | 0.34 Oe |
| $\frac{dB}{dH}\Big\vert_{H_c}$ | 45829 |

In a separate operation, a single remanently magnetizable thin-film of $Fe_{88}$-$Cr_{12}$ alloy having a thickness of 2 μm was deposited by e-beam evaporation onto a polyimide ("Kapton") film 50 μm in thickness. The resulting laminate was cut into squares, each 4.2 mm on a side. Using a pressure-sensitive adhesive transfer film 25 μm in thickness, the exposed faces of the squares were bonded to the outermost Ni-Fe thin-film of the signal-producing layer in the pattern of FIG. 2 of the drawing with a spacing of 2.1 mm between adjacent squares.

The segmented Fe-Cr signal-blocking layer of the resulting dual-status marker was magnetized by translating it across a unidirectional magnetic field. When tested in an EAS system as in Example 1 while its signal-blocking layer was magnetized, the marker was passive and did not produce an alarm signal in the interrogation zone. When the signal-blocking layer was demagnetized, the magnetization state of the signal-producing layer was periodically reversed to produce an alarm signal.

EXAMPLE 3

A dual status marker was prepared as disclosed in Example 2 except as indicated. Onto a polyimide ("Kapton") film were sequentially deposited eleven layer pairs of magnetic thin-films of Ni-Fe alloy (each 35 nm in thickness) and nonmagnetic thin-films of $SiO_x$ (each 10 nm in thickness). In an alternating magnetic field of 10 kHz and an amplitude of 2 Oe, a sample 2.5 cm square had

| | |
|---|---|
| $B_m$ | 9899 G |
| $B_r/B_m$ | 0.89 |

-continued

| | |
|---|---|
| $H_c$ | 0.55 Oe |
| $\frac{dB}{dH}\|_{H_c}$ | 44055 |

Onto the exposed Ni-Fe thin-film layer were deposited four layer pairs of remanently magnetizable thin-films of $Fe_{90}Cr_{10}$ (each 100 nm in thickness) and nonmagnetic thin-films of $CrO_x$ (each 10 nm in thickness applied by reactive sputtering).

The continuous signal-blocking layer of the resulting dual-status marker was then magnetized as in Example 1, thus preventing the marker from producing an alarm signal when exposed to the aforementioned magnetic field.

The dual status marker was tested in 3M's Model 3300B magnetic-type EAS system. When its signal-blocking layer was magnetized, the marker was passive and did not produce an alarm signal in the interrogation zone of the EAS system. When the signal-blocking layer was demagnetized, the magnetization state of the signal-producing layer was periodically reversed to produce an alarm signal.

What is claimed is:

1. A dual status marker for use with a magnetic electronic article surveillance system, which system produces in an interrogation zone alternating magnetic fields having average peak intensities of less than 20 Oersteds, the dual status marker comprising:

- a signal-producing layer having a differential permeability above 5000 and a coercive force less than the average peak intensities encountered in the interrogation zone, such that upon exposure to the alternating magnetic fields, the magnetization state of the signal-producing layer is periodically reversed thus producing an alarm signal; and
- a signal-blocking layer in substantial contact with the signal-producing layer, the signal-blocking layer comprised of a plurality of remanently magnetizable deposition film layer, the signal blocking layer further having a coercivity above 25 Oe and providing magnetic flux such that the signal-producing layer is prevented from producing the alarm signal in the interrogation zone when the signal-blocking layer is magnetized.

2. A dual status marker as defined in claim 1 wherein said plurality of remanently magnetizable deposition films comprises an Fe-Cr alloy having a Cr content up to about 20 atomic percent.

3. A dual status marker as defined in claim 2 wherein the Cr content of said plurality of remanently magnetizable deposition films is from 1 to 15 atomic %.

4. A dual status marker as defined in claim 1 wherein said plurality of remanently magnetizable deposition films has a total thickness from 2 to 5 times the total thickness of the signal-producing layer.

5. A dual status marker as defined in claim 1 wherein the total thickness of the plurality of remanently magnetizable deposition films is from 0.8 to 1.2 μm.

6. A dual status marker as defined in claim 1 wherein the remanently magnetizable deposition films are discontinuous.

7. A control element which affords dual status to a marker having a signal-producing layer that produces an alarm signal when the marker is passed through an interrogation zone of a magnetic electronic article surveillance system, the control element comprising:

- a plurality of remanently magnetizable deposition film layer having a coercivity above 25 Oe and providing magnetic flux such that, when placed in substantial contact with the signal-producing layer, the signal-producing layer is prevented from producing the alarm signal in the interrogation zone when the plurality of remanently magnetizable deposition films are magnetized.

8. A marker-deactivating product as defined in claim 7 wherein said plurality of remanently magnetizable thin-films have a total thickness of from 0.8 to 1.2 μm.

9. A dual status marker as defined in claim 1 wherein the signal-blocking layer further comprises alternating layers of remanently magnetizable deposition films and non-magnetic deposition films.

10. A dual status marker as defined in claim 9 wherein discontinuities of the at least one remanently magnetizable deposition film are segments of substantially uniform size and shape.

11. A dual status marker as defined in claim 10 wherein each of the segments has an area of from 1 to 100 $mm^2$.

12. A dual status marker as defined in claim 1 further including a substrate adapted to support the signal-producing layer and the signal-blocking layer.

13. A dual status marker as defined in claim 12 wherein the substrate is a flexible web.

14. A dual status marker as defined in claim 12 wherein the substrate comprises an article that is to be protected against theft.

15. A dual status marker as defined in claim 1 wherein the marker has an area of from 2 to 10 $cm^2$.

16. A dual status marker as defined in claim 12 wherein each of the nonmagnetic deposition films is no greater than 20 nm in thickness.

* * * * *

UNITED STATES PATENT AND TRADEMARK OFFICE

CERTIFICATE OF CORRECTION

PATENT NO.: 5,580,664

DATED: December 3, 1996

INVENTOR(S): Ching-Long Tsai

It is certified that error appears in the above-identified patent and that said Letters Patent is hereby corrected as shown below:

Column 6, line 56, delete "a area" and insert therefore –an area--.

Column 9, line 39, claim 1, delete "film" and insert therefore –films--.

Column 9, line 39, clain 1, delete "layer" after the word "films".

Column 10, line 16, claim 7, delete "film" and insert therefore –films--.

Column 10, line 17, claim 7, delete "layer" after the word "films".

Signed and Sealed this

Thirtieth Day of December, 1997

*Attest:*

Bruce Lehman

BRUCE LEHMAN

*Attesting Officer*

*Commissioner of Patents and Trademarks*